United States Patent

Wills et al.

[11] Patent Number: 4,741,479
[45] Date of Patent: May 3, 1988

[54] ROTARY DRUM ATOMISER

[75] Inventors: Barry G. Wills; Wladyslaw J. Rokicki, both of Werribee; Geoffrey O. Furness, Loxton, all of Australia

[73] Assignee: State of Victoria as represented by the Minister for the Dept. of Agriculture and Rural Affairs, Australia

[21] Appl. No.: 871,101

[22] Filed: Jun. 5, 1986

[30] Foreign Application Priority Data

Jun. 5, 1985 [AU] Australia ............................ PH00918

[51] Int. Cl.⁴ .............................................. B05B 3/04
[52] U.S. Cl. .......................... 239/214.25; 239/222.11; 239/223
[58] Field of Search ................... 239/223, 224, 214.21, 239/77, 78, 214.13, 214.15, 214.17, 214.25, 214, 701–704, 222, 240, 214.11, 214.19, 222.11, 383, 7

[56] References Cited

FOREIGN PATENT DOCUMENTS

| 141263 | 7/1949 | Australia . |
|---|---|---|
| 244118 | 12/1962 | Australia . |
| 262374 | 4/1964 | Australia . |
| 449483 | 10/1973 | Australia . |
| 71824 | 7/1974 | Australia . |
| 469411 | 6/1975 | Australia . |
| 15862 | 7/1976 | Australia . |
| 48277 | 6/1979 | Australia . |
| 56147 | 3/1980 | Australia . |
| 84361 | 6/1982 | Australia . |
| 84362 | 6/1982 | Australia . |
| 16347 | 6/1983 | Australia . |

OTHER PUBLICATIONS

Becco Products Co., Catalog Extract, Model 360 & 361.

Primary Examiner—Andres Kashnikow

[57] ABSTRACT

An atomiser having a drum which has a driving end portion and an annular portion extending therefrom, there being slots extending in an axial direction between the inner drum surface and the outer drum surface of the annular portion, so that there are a plurality of edges from which the liquid film moves away from the drum to form droplets and the film can thereby be thin even though rates of flow of the order of 2 liters/minute can be discharged from a small drum.

4 Claims, 3 Drawing Sheets

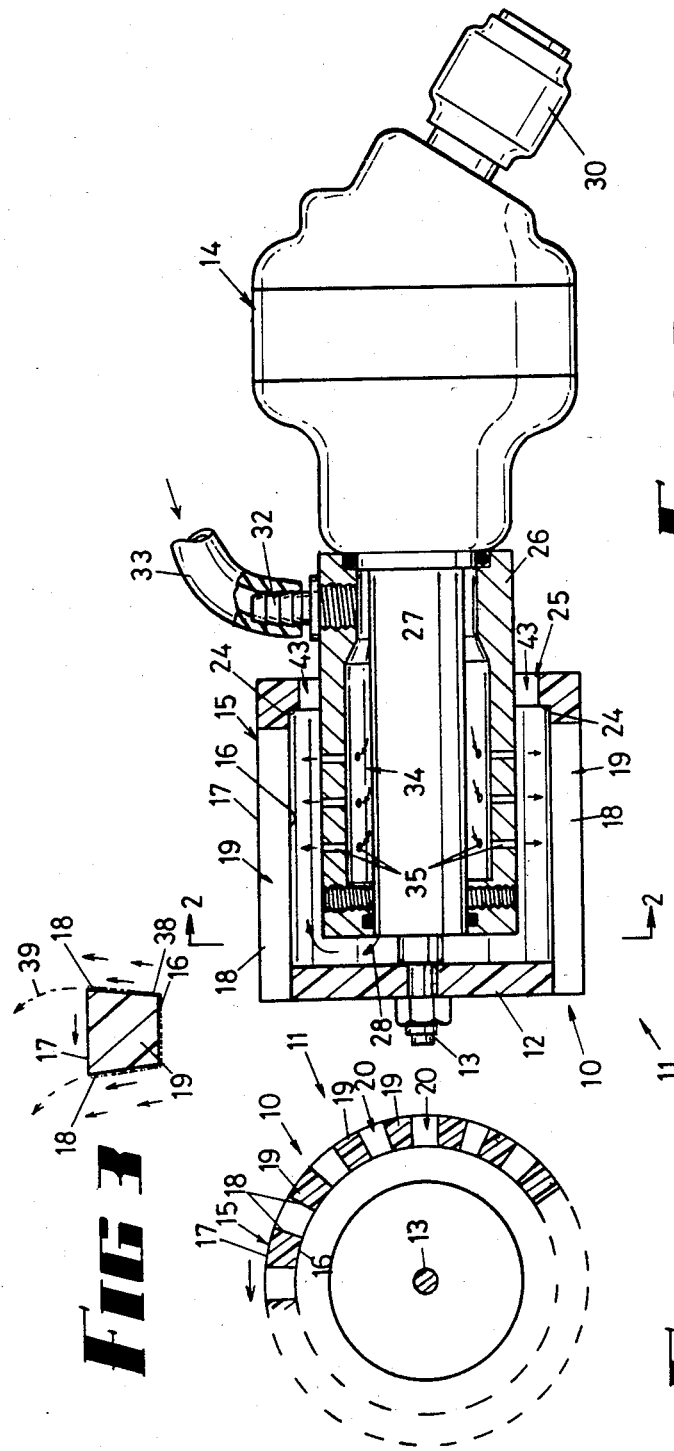

FIG. 6 CI
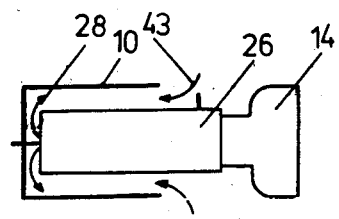
FIG. 6 CII
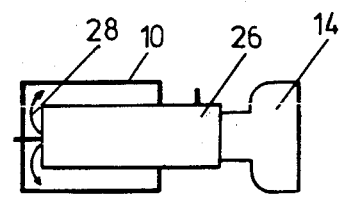
FIG. 6 CIII
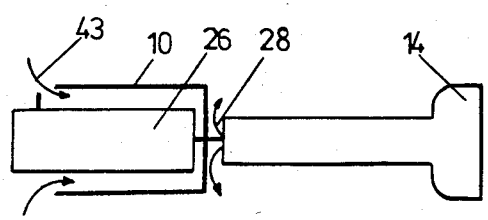
FIG. 6 CIV
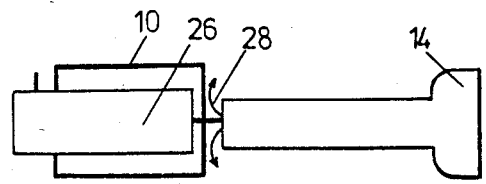

ROTARY DRUM ATOMISER

This invention relates to devices and component parts of devices and methods for atomising liquids, utilising rotary atomisers.

BACKGROUND OF THE INVENTION

Various forms of atomisers are known and have been used for applying liquids to plant foliage or areas near the plants. As an example agricultural chemicals such as pesticides or weedicides are applied by this technique to protect economic plants from insects and weeds. Droplet size of the liquid after atomisation is important in determining the efficiency by which the liquid is deposited on the target. If the droplets are less than optimum size the efficiency of deposition on the target can be reduced by factors such as wind. Similarly if the droplets are larger than optimum sufficient numbers of droplets may not be produced for adequate target coverage, they may run off the target without sticking, or they may fall to the ground under the influence of gravity before reaching the target.

STATE OF THE ART

Traditional practice is to atomise liquids by using hydraulic nozzles through which liquid is introduced under pressure. This technique usually leads to a wide spectrum of droplet size. Consequently much of the pesticide is in droplets which are not of optimum size and hence may not be deposited on the target.

Rotary atomisers are another known form of liquid atomisers and generally they produce droplets of narrower droplet size distribution which increases the proportion of liquid deposited on the target. This type of atomiser is such that the operator is able to exercise control over the droplet size. They are known a Controlled Droplet Applicators (CDA). A known type of rotary atomiser comprises a drum member whose annular body is usually made either of sheet metal containing slots or a wire screen. In operation fluid is fed to the inner surface of the annular body and is forced through the openings in the body by centrifugal forces upon rapid rotation of the drum member. Such a rotary atomiser usually also comprises a fan arranged to direct the droplets emerging from the openings in the annular body towards the target.

A Data Bank search has been conducted to ascertain the state of the art with respect to United States and Australian patents and the closest art disclosed by that search was contained in the Australian specification No. 21792/83 and in the U.S. specification No. 4,430,155. In 21792/83 there was disclosed a configuration having a plurality of annular rings, but the liquid to be atomised was fed into the concave rear surface of atomiser disc 54 and was delivered mainly from the rim of that disc. The U.S. specification No. 4,430,155 illustrated the use of a plurality of bristles inside a spray chamber and these had some effect in reducing droplet size.

If atomisation takes place only from a discoid edge, the flow of liquid to that edge will either be limited to a very thin film and thus a slow rate of flow which is inconvenient for practical use, for example in an orchard or over a crop, or alternatively if a fast flow rate is permitted, the film thickness will be so great that it will not be feasible to retain the required spectrum of droplet size. The aforesaid difficulties of oversize drops will then be encountered.

The main object of this invention is to produce as many drops as possible within size range of 50 to 300 μm diameter, and avoid the difficulty encountered with prior art devices which use hydraulic nozzles and provide little control over the drop spectrum produced. Experimentation has indicated that maximum efficiency is achieved when the drops are of the size 50 to 300 μm. By utilising drops of this dimension the drops being deposited on leaves appear to be almost equidistant from each other, and it is believed that some electrostatic properties are possessed by the atomised flow.

BRIEF SUMMARY OF THE INVENTION

In this invention use is made of a drum which has a driving end portion and an annular portion extending therefrom, there being slots extending in an axial direction between the inner drum surface and the outer drum surface of the annular portion, so that there are a plurality of edges from which the liquid film moves away from the drum to form droplets and the film can thereby be thin even though rates of flow of the order of 2 litres/minute can be discharged from a small drum.

If the drum wall thickness is made great, for example greater than the slot width, the film which moves out over the slot defining surfaces will accelerate under centrifugal force and thereby be very thin at the point of leaving the periphery of the drum, and this is of great assistance in control of droplet size.

When a rotary drum atomiser is used in agricultural applications it discharges droplets into a flow of air established by a driven fan and this transports a cloud cf insecticide, for example, over the trees, vines or other crops. The atomising of droplets into the airflow is therefore not even, but the applicants have discovered that if air is passed along with the liquid through the slots of the drum of this invention, that radially travelling air entrains the droplets and ensures the formation of droplets within the required spectrum size, as well as carrying those droplets readily outwardly into the outer zones of the fan induced air stream as it passes over the atomiser.

Thus, in one aspect of this invention, a drum for a rotary drum atomiser comprises a driving end portion having a central drive engaging surface of such shape and size that it is attachable to an output shaft of drive means, and an annular portion extending from the end portion, an inner drum surface and an outer drum surface defining said annular portion, and slot surfaces extending along the drum and spaced from one another around the drum, said slot surfaces extending between the inner and outer drum surfaces and defining a plurality of circumferentially spaced slots around said annular portion.

The invention also extends to a rotary drum atomiser, and in another aspect comprises an air operable turbine, an air inlet attachment for the turbine, a shaft housing extending from the turbine, an output shaft journalled for rotation in the shaft housing and projecting from one end thereof, said shaft housing also comprising a passage for air when exhausted from said turbine, a body member surrounding said shaft housing and having a cylindrical wall with an inner surface spaced radially away from said shaft housing to define an annular space, a liquid inlet fitting extending from said body member and in fluid flow communication with said annular space, apertures extending through said body member cylindrical wall for discharge of liquid from said annular space, and a drum as above described carried on the shaft and having its annular portion surrounding said body member apertures.

Still further the invention in another aspect comprises a method of atomising liquid which comprises driving the drum of a rotary drum atomiser as above described by the air turbine, pumping said liquid into said annular space between said shaft housing and said body member and discharging from that annular space through said body member apertures within said drum annular portion, while simultaneously exhausting air from the turbine also within said annular portion.

BRIEF DESCRIPTION OF THE DRAWINGS

An embodiment of the invention is described hereunder in some detail with reference to, and is illustrated in the accompanying drawings in which:

FIG. 1 is a partly sectioned elevational view of a rotary drum atomiser,

FIG. 2 is a cross-section through the drum thereof taken on line 2—2 of FIG. 1,

FIG. 3 is an enlarged cross-sectional view which illustrates a flow of liquid over a bar between two slots as illustrated in FIG. 2, but drawn to a larger scale, FIG. 6 shows four alternative configurations which were separately tested in a testing programme and provided the results illustrated in the appended charts CI, CII, CIII and CIV.

Figure 4:
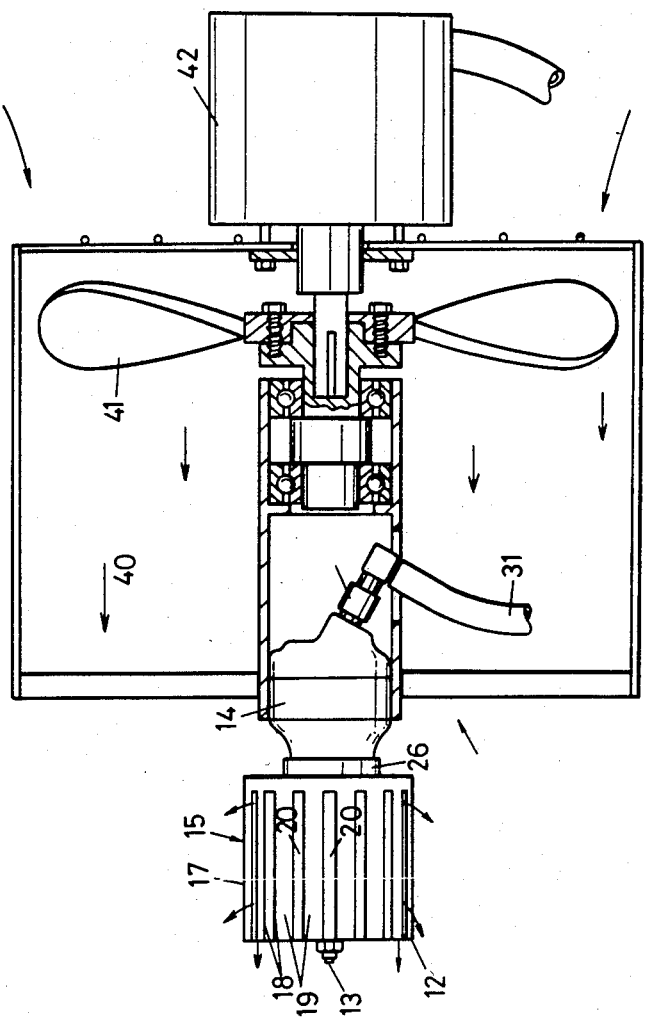
FIG. 4 is a partly sectioned side elevation of an atomiser and fan assembly drawn to a smaller scale.
Figure 5:
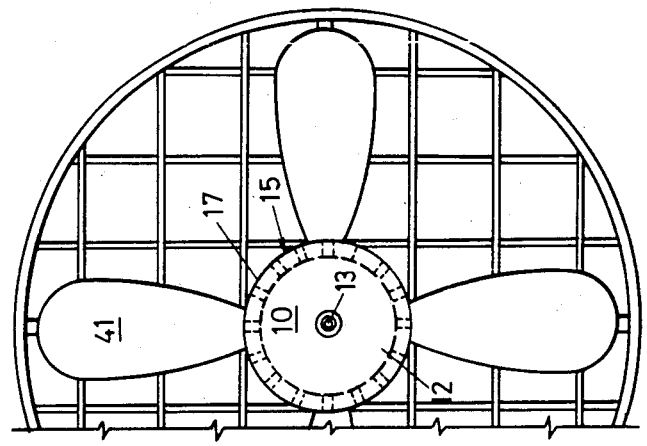
FIG. 5 is a fragmentary end elevation of FIG. 4.

Referring first to the embodiments of FIGS. 1 through to 5, a drum 10 for a rotary atomiser 11 is formed from acetyl resin and comprises a driving end portion 12 having a central drive engaging surface which is secured to the output shaft 13 of a drive turbine 14, the drum having an annular portion 15 extending from the end portion 12, the annular portion 15 having an inner drum surface 16 and an outer drum surface 17 which defines the annular portion 15, and a plurality of slot surfaces 18 which extend around the drum 10 and are spaced from one another circumferentially. These slot surfaces 18 form a plurality of axially extending bars 19 between which are located the slots 20 through which pass the insecticide or other atomised liquid upon operation of the atomiser 11.

Each slot 20 extends for most but not all of the length of the annular portion 15, and at the drum end portion opposite the driving end portion 12, terminates in an inwardly facing lip 24 which surrounds an opening 25 so that the drum is normally positioned over a body member 26 surrounding a shaft housing 27 of turbine 14 as illustrated best in FIG. 1.

The turbine 14 is provided with an air inlet attachment 30 connected to a source of air at about 700 KPa (100 psi) by an air hose 31 (FIG. 4) and the air hose 31 is placed in communication with an inline lubricator, the air passing through the turbine 14 to lubricate the bearings thereof, and exhausting through the hollow shaft housing 27 as a primary air flow 28. The body member 26 is provided with a liquid inlet fitting 32 to which is secured a liquid hose 33 connected to pump means for pumping insecticide into the annular space 34 between the body member 26 and shaft housing 27, and the liquid is then discharged through apertures 35 from the annular spac 34 and within the drum 10.

Although the device can be made to function without the addition of airflow exhausted from turbine 14 to the space within drum 10, the airflow greatly enhances the movement of the film of liquid over the slot forming surfaces 18 of bars 19 as shown diagrammatically in FIG. 3, since it increases the velocity of the liquid and thereby reduces film thickness, and as the liquid leaves those surfaces, the droplets are formed in a much better spectrum of size than can be achieved without the airflow. The increase of velocity also increases the triboelectric effect, and enhances the electrostatic charge on the droplets of liquid, which in turn improves coverage over foliage.

FIG. 3 shows the liquid film 38 flowing radially outwardly over the slot surfaces 18 and breaking away at the periphery of the drum as a very thin film (only a few microns in thickness) into the droplets, some of which penetrate into the outer zone of the airstream 40 (FIG. 4) created by the fan 41 driven by hydraulic motor 42.

The bars 19 function to some extent as impeller blades and induce a secondary airflow 43 into the hollow of the drum 10 to be discharged along with the air discharged through the shaft housing 27 of the liquid discharged through apertures 35.

Quantitive tests have been conducted by the Victorian Department of Agriculture and Rural Affairs in Australia for the four configurations marked CI, CII, CIII and CIV (FIG. 6). The following is a summary of a test report from said Department:

TESTING OF ROTARY ATOMISER

1. INTRODUCTION

The availability of commercial technology for controlled drop application of pesticides is receiving considerable attention from the community. Scientists, farmers and other producers are dealing with the balance between food production, control of pests and diseases and the environmental hazards of pesticides.

Conventional spraying practice using hydraulic nozzles gives very little control over the drop spectrum produced. For greater efficiency it is necessary to get more of the spray in drops of a size that are most likely to collect on the biological target. Controlled drop application (C.D.A.) techniques can produce drops within a narrower size range. More of the spray can thus be delivered to the target in the desired size. Greater size control also leads to other advantages such as reduced application volumes, and less environmental pollution.

An atomiser was designed at the Agricultural Engineering Centre to produce as many drops as possible within the size range 50 to 300 μm diameter. The prototype device, based on a slotted rotating drum was run on an air motor driven by compressed air.

Other rotary atomisers use drums made of thin perforated or slotted metal with a rear seal to protect bearings. A seal was unnecessary in the AEC design, thereby allowing the drum to remain open at its rear-end. This, in combination with the slots created a fan effect similar to a centrifugal blower when rotated. As a further experiment, mainly to simplify design, the exhaust air from the motor was released inside the drum. This was in marked contrast to other devices which have virtually no intra-drum air flow.

It became apparent that these air flows were having an advantageous effect on the drop sizes produced. This report gives some of the results from a testing program aimed at determining the significance of the different air flows and quantifying their effects on drop spectra.

The first user of the atomiser had also observed that drops deposited on leaves appeared equidistant from each other and suggested that the spray cloud might possess electrostatic properties.

Consequently, some sample measurements of spray charge were made and the results are reported here.

2. THE ROTARY SLOTTED DRUM ATOMISER

During operation air discharges radially from the rotating drum along with atomised liquid. The air is from two sources: firstly, exhaust air from the turbine is discharged inside the drum to depart via the slots. Secondly, the rotating slotted drum acts centrifugally by drawing additional air in via the drum's open end and delivering it radially outwards, again through the slots.

The air motor (turbine type, Desoutter (05-X-80000)) operates at loaded speeds of 4000 to 10,000 revolutions per minute depending on air pressure and liquid flow rate. Normal atomiser operation requires about 0.05 m$^3$ per minute of air at 600 kPa and gives an estimated maximum useful liquid flow rate of about 1.5 litres per minute before loss of drop size control.

3. TEST PROCEDURE

Drop spectra were measured using a Malvern 2200/3300 particle sizer. Size distributions were analytically generated on a computer by applying the two parameter Rosin Rammler distribution to the data.

Tests were carried out with the aim of examining the effect of the internal air flows on the drop spectra. In order to isolate the effects of the two different types of air flow present, four different drum configurations were assessed.

CONFIGURATION I—Normal configuration consisting of the open ended drum with both the centrifugal and exhaust air flows acting.

CONFIGURATION II—Drum closed at both ends resulting in only the exhaust air flow acting.

CONFIGURATION III—Open ended drum with only the centrifugal air acting. The motor exhaust does not enter the drum.

CONFIGURATION IV—Drum closed at ends with no significant air flow inside.

Rotational speeds of 3500 to 7000 revolutions per minute were used in the tests and were adjusted by changing the pressure of the compressed air supply. A drum diameter of 50 mm was used, and this corresponded to a peripheral speed of from 9 to 18 m/sec.

Clean mains water was used in the tests at a constant liquid flow rate of 0.5 L per minute, which was monitored by a flowmeter.

The consumption of the motor was measured by a flowmeter installed in the air supply line. Electrostatic charge level of the spray cloud was measured using the apparatus shown in FIG. 2. The atomiser was placed in the central part of a perforated aluminium screen of 600 mm diameter which was connected to a voltmeter. A light petroleum oil (trade name C.R.C.) was used as a spray liquid in order to minimise possible discharge to moisture existing in the atmosphere. Such conditions would indicate the maximum charge potential of the spray.

4. RESULTS

Differences in drop spectrum are compared using the following statistics: VMD (Volume Median Diameter), VMD/NMD ratio (Volume Median Diameter/Number Median Diameter), and % volume in size ranges 50–300 µm and 100–300 µm.

(i) The influence of rotational speed in VMD for the four drum configurations is shown in Charts I and II, which employed both air flows, consistently produced VMD's about 20 µm smaller than the "no-air" configuration IV. The major contributor to this appears to be the exhaust air (CII). There is no significant effect on the VMD due to the centrifugal component (CIII).

(ii) VMD/NMD ratios are compared in Chart III. The lower the VMD/NMD ratio, the narrower is the range of drop sizes produced. For speeds above 4000 rev/min the ratios for configuration 1 vary between 4 and 6, while for configuration III and IV between 4 and 10.

Drop spectra with relatively stable VMD/NMD ratios were produced by configuration II with values increasing as rotational speed decreased. (Chart IV).

Slower speeds produced wider drop spectra as indicated by higher VMD/NMD ratios.

(iii) The mean percentage weight (or volume) of spray in the size range 50 to 300 µm over all tests was highest for configuration 1- approx 88% compared with 85%, 80% and 80% for configurations II, III and IV respectively. The ability of the "Exhaust and Centrifugal Air" configuration I to produce more of its spray volume in the above size range was particularly evident at speeds from 4500 to 6000 rev/min.

Similar traits were found in the slightly larger 100 to 300 µm size range. The atomiser produced a maximum 80% of its spray volume in those sizes with about 17% of its spray volume below 100 µm, and the remaining 3% above 300 µm.

(iv) Preliminary measurements have shown that the spray cloud possesses a current of the order $i_c = -4 \times 10^{-3} \mu A$ for a liquid flow rate of 0.07 L min$^{-1}$ and $i_c = -8.7 \times 10^{-3} \mu A$ for 0.15 L min$^{-1}$. The rotational speeds were about 9000 rev/min and 7900 rev/min respectively. These measurements, however, can only be regarded as approximate due to the limited accuracy of the equipment used.

In addition to the physical properties of the atomiser, the drop charging capability depends upon the electrical resistivity of the spray liquid, so the current level will vary with different chemical formulations. Commonly used electrostatic sprayers have cloud charge levels of about $-6$ to $-10$ µA. That is, about 10$^3$ times higher than detected for the plastic slotted drum.

5. CONCLUSIONS (i) The use of both motor exhaust and centrifugal air flows in combination within the slotted drum gave smaller and narrower drop spectra than the "no-air" case over a wider speed range.

(ii) Motor exhaust air gave greater enhancement of drop size control than centrifugal air.

(iii) The use of centrifugal air alone leads to wider drop spectra (reduced control) than the conventional "no-air" case and all other cases tested.

(iv) Studies on the electrostatic properties of the spray cloud were inconclusive. The sample measurements indicate the order of magnitude of the spray charge to be much lower than other electrostatic sprayers. It is proposed to make more measurements to determine whether the charge possessed by the spray is relevant to drop deposition.

(v) Experience during the test program showed the distribution of liquid provided inside the drum by the feed collar to be a critical factor governing drop spectra.

Whilst the prototype feed collar was designed to provide a reasonably uniform liquid distribution it is likely that further improvements to the feed system would result in better atomiser performance.

(vi) The general conclusions relating to the influence of air flows can reasonably be expected to hold true for other dimensionally similar units of differing scale. Any change of dimension, however, will lead to different drop sizes than those delivered by the test unit.

Various modifications in structure and/or function may be made by one skilled in the art to the disclosed embodiments and invention without departing from the scope of the invention as defined by the claims.

What is claimed is:

1. A rotary drum atomiser comprising a drum having a driving end portion, an inner drum surface and an outer drum surface defining an annular drum portion, and slot surfaces extending along the drum and spaced from one another around the drum, the slot surfaces extending between the inner and outer drum surfaces and defining a plurality of circumferentially spaced slots around said annular portion, an air operable turbine assembly comprising a turbine, an air inlet attachment for the turbine, a shaft housing extending from the turbine through the drum but terminating before the driving end portion of the drum, an output shaft journalled for rotation in the shaft housing and having an end thereof projecting from one end of the housing, means securing that said end of the output shaft to the driving end portion of the drum, said shaft housing also comprising a passage for air when exhausted from said turbine, a body member within the drum and surrounding said shaft housing and having a cylindrical wall with an inner surface spaced radially away from said shaft housing to define an annular space, a liquid inlet fitting extending from said body member and in fluid flow communication with said annular space, apertures extending through said body member cylindrical wall for discharge of liquid from said annular space, said driving end portion of said drum being spaced from the end of said shaft housing such that air when exhausted from said turbine is deflected by said driving end portion into said drum and discharge through said slots.

2. A drum according to claim 1 wherein each said slot extends in an axial direction and each said slot surface also extends in a radial direction.

3. A drum according to claim 1 further comprising an annular opening in a drum end portion opposite said driving end portion, and defined by an inwardly facing lip, each slot extending between the end portions.

4. A drum according to claim 1 wherein the width of each said slot (in a radial direction) exceeds the slot space between them.

* * * * *